United States Patent
Nitz et al.

(10) Patent No.: US 10,551,590 B2
(45) Date of Patent: Feb. 4, 2020

(54) GLASS MIRROR APPARATUS AND METHODS OF MANUFACTURING A GLASS MIRROR APPARATUS

(71) Applicant: CORNING INCORPORATED, Corning, NY (US)

(72) Inventors: Christopher Alan Nitz, Painted Post, NY (US); Michael Aaron McDonald, Painted Post, NY (US); Chunhe Zhang, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 1138 days.

(21) Appl. No.: 14/768,849

(22) PCT Filed: Feb. 26, 2014

(86) PCT No.: PCT/US2014/018549
§ 371 (c)(1),
(2) Date: Aug. 19, 2015

(87) PCT Pub. No.: WO2014/134114
PCT Pub. Date: Sep. 4, 2014

(65) Prior Publication Data
US 2016/0004033 A1      Jan. 7, 2016

Related U.S. Application Data

(60) Provisional application No. 61/770,385, filed on Feb. 28, 2013.

(51) Int. Cl.
G02B 7/182    (2006.01)
C03C 17/06    (2006.01)
(Continued)

(52) U.S. Cl.
CPC .............. *G02B 7/182* (2013.01); *C03C 17/06* (2013.01); *C03C 17/3663* (2013.01);
(Continued)

(58) Field of Classification Search
CPC .... G02B 5/0808; G02B 5/0816; G02B 7/182; B32B 17/10036; B32B 17/10137;
(Continued)

(56) References Cited

U.S. PATENT DOCUMENTS 2,468,568 A    4/1949    McCusker
3,790,748 A    2/1974    Van Laethem et al.
(Continued)

FOREIGN PATENT DOCUMENTS

CA    2821205 A1    6/2012
CN    1199863 A    11/1998
(Continued)

OTHER PUBLICATIONS

English translation of CN201480023904.4 First Office Action dated Feb. 28, 2017, China Patent Office.
(Continued)

*Primary Examiner* — Ricky D Shafer
(74) *Attorney, Agent, or Firm* — John P. Ciccarelli

(57) ABSTRACT

Example methods of manufacturing a glass mirror apparatus includes the step of providing a chemically strengthened glass sheet with a thickness of less than or equal to about 2 mm. The method further includes the step of applying a reflective layer to the second major surface of the glass sheet to provide a first glass mirror. In further examples, a glass mirror apparatus comprises a chemically strengthened glass sheet with a thickness of less than or equal to about 2 mm. A reflective layer applied to the second major surface of the glass sheet to provide a first glass mirror.

16 Claims, 2 Drawing Sheets

(51) Int. Cl.
*C03C 17/36* (2006.01)
*C03C 27/10* (2006.01)
*G02B 1/14* (2015.01)
*G02B 5/08* (2006.01)

(52) U.S. Cl.
CPC ................ *C03C 27/10* (2013.01); *G02B 1/14* (2015.01); *G02B 5/0816* (2013.01)

(58) Field of Classification Search
CPC . B32B 17/1022; C03C 17/06; C03C 17/3663; C03C 27/10
USPC ....... 359/840, 872, 883, 871, 900; 65/30.13, 65/30.14
See application file for complete search history.

(56) References Cited

U.S. PATENT DOCUMENTS

| | | | |
|---|---|---|---|
| 4,422,893 A | 12/1983 | Duchaeau et al. | |
| 4,483,700 A | 11/1984 | Forker, Jr. et al. | |
| 4,511,618 A | 4/1985 | Duchene et al. | |
| 4,550,986 A | 11/1985 | Leach | |
| 5,283,696 A | 2/1994 | Lanser et al. | |
| 5,674,790 A | 10/1997 | Araujo | |
| 5,691,256 A * | 11/1997 | Taguchi | C03C 3/097 501/5 |
| 5,731,070 A * | 3/1998 | Endo | G11B 5/7325 428/216 |
| 5,746,893 A * | 5/1998 | Kobayashi | G11B 5/66 204/192.2 |
| 5,959,793 A | 12/1999 | Kellman-Turek | |
| 6,414,781 B1 * | 7/2002 | Saitoh | G02F 1/133308 349/149 |
| 6,416,194 B1 * | 7/2002 | Demiryont | C03C 17/36 359/359 |
| 6,480,335 B1 | 11/2002 | Nakaho et al. | |
| 6,638,623 B2 * | 10/2003 | Jensen | C03C 21/002 427/431 |
| 7,666,511 B2 | 2/2010 | Ellison et al. | |
| 7,871,664 B2 | 1/2011 | O'Connor et al. | |
| 8,518,545 B2 * | 8/2013 | Akiba | C03C 3/085 428/410 |
| 9,079,802 B2 * | 7/2015 | Bellman | G02B 1/105 |
| 9,339,993 B2 * | 5/2016 | Cites | B32B 17/00 |
| 9,828,278 B2 * | 11/2017 | Zhang | C03B 33/0222 |
| 9,840,435 B2 * | 12/2017 | Ohara | C03C 21/002 |
| 9,963,378 B2 * | 5/2018 | Yamamoto | C03C 3/085 |
| 2010/0285277 A1 * | 11/2010 | Edwards | C03C 27/048 428/157 |
| 2011/0085257 A1 | 4/2011 | O'Connor et al. | |
| 2011/0165393 A1 * | 7/2011 | Bayne | C03C 15/02 428/215 |
| 2012/0083401 A1 * | 4/2012 | Koyama | C03C 3/085 501/70 |
| 2012/0094084 A1 * | 4/2012 | Fisher | B32B 17/10036 428/174 |
| 2012/0134025 A1 * | 5/2012 | Hart | C03C 15/00 359/601 |
| 2012/0196033 A1 * | 8/2012 | Sakai | G11B 5/8404 427/128 |
| 2013/0265667 A1 | 10/2013 | Liu | |
| 2014/0099501 A1 * | 4/2014 | Yamamoto | C03C 3/085 428/335 |
| 2015/0140301 A1 * | 5/2015 | Fisher | B32B 17/10036 428/215 |

FOREIGN PATENT DOCUMENTS

| | | |
|---|---|---|
| CN | 201011527 Y | 1/2008 |
| CN | 101980063 A | 2/2011 |
| CN | 201822406 U | 5/2011 |
| CN | 201834858 U | 5/2011 |
| GB | 1578074 | 10/1980 |
| IT | 1377576 B | 7/2010 |
| JP | 59155353 U | 10/1984 |
| JP | 6170803 U | 5/1986 |
| JP | 06321587 A | 11/1994 |
| JP | 2001247342 A | 9/2001 |
| JP | 2002004738 A | 1/2002 |
| JP | 2004182487 A | 7/2004 |
| JP | 2011247342 A | 12/2011 |
| WO | 2011085190 A1 | 7/2011 |
| WO | 2012051038 A1 | 4/2012 |
| WO | 2012077771 A1 | 6/2012 |
| WO | 2012128227 A1 | 9/2012 |
| WO | 2012047248 A1 | 12/2012 |

OTHER PUBLICATIONS

"Innovative Design for the Latest Insulation Materials and Their Products Formula, the Relevant Quality Inspection Technical Standards Manual," Guangzhou Audio and Video Press, pp. 319-321, 2004.
English Translation of JP2015560268 Office Action dated Jan. 9, 2018; 6 pages; Japanese Patent Office.
http://www.dullesglassandmirror.com/laminated-glass.asp, Dulles Glass & Mirror website, 2015 Dulles Glass and Mirror, Aug. 14, 2015.
http://kangdeli.manufacturer.globalsources.com/si/6008825859096/Homepage.htm, Global Sources, Qingdao Kangdeli Industrial & Trading Co., Ltd., 2015 Trade Media Holdings, Ltd., Aug. 14, 2015.
International Search Report and Written Opinion, dated May 23, 2014, International Application No. PCT/US2014/018549, International Filing Date May 23, 2014.
JP2015560268 Office Action dated Dec. 19, 2018, Japan Patent Office.

* cited by examiner

GLASS MIRROR APPARATUS AND METHODS OF MANUFACTURING A GLASS MIRROR APPARATUS

CROSS REFERENCES

This application claims the benefit of priority under 35 U.S.C. 371 of International Application Number PCT/US14/18549 filed on Feb. 26, 2014 which claims the benefit of priority to U.S. Application No. 61/770,385 filed on Feb. 28, 2013 the content of which is incorporated herein by reference in its entirety.

FIELD

The present invention relates generally to glass mirror apparatus and methods of manufacturing a glass mirror apparatus and, more particularly, to glass mirror apparatus including a chemically strengthened glass sheet with a thickness of less than or equal to about 2 mm and methods of manufacturing a glass mirror apparatus with a chemically strengthened glass sheet with a thickness of less than or equal to about 2 mm.

BACKGROUND

It is known to glass mirrors for various applications. Glass mirrors are known to be fabricated from a monolithic soda lime sheet of glass that may have relatively thick sheets of glass, such as 3 mm thick. A reflective coating is typically applied to a major surface of the sheet of soda lime glass to provide a mirror finish. The resulting mirror may be beneficial for certain applications but can be relatively heavy due to the thickness of the glass sheet necessary to provide the desired structural integrity. Moreover, the conventional glass mirrors are subject to damage from impact under certain environmental conditions such as vandalism, inadvertent impact from foreign objects or other conditions that may chip, scratch, crack or even shatter the monolithic soda lime sheet of glass.

SUMMARY

The following presents a simplified summary of the disclosure in order to provide a basic understanding of some example aspects described in the detailed description.

In accordance with a first aspect of the disclosure, a method of manufacturing a glass mirror apparatus comprises the step (I) of providing a chemically strengthened glass sheet with a thickness defined between a first major surface and a second major surface of the glass sheet. The thickness is less than or equal to about 2 mm. The method further includes the step (II) of applying a reflective layer to the second major surface of the glass sheet to provide a first glass mirror.

In accordance with one example of the first aspect, step (I) provides the thickness of the glass sheet within a range of from about 0.5 mm to about 1.2 mm. In accordance with another example of the first aspect, step (I) provides the glass sheet as an ion exchange chemically strengthened glass sheet. In accordance with still another example of the first aspect, step (I) provides the strengthened glass sheet with a compressive stress within a range of from about 500 MPa to about 800 MPa. In accordance with yet another example of the first aspect, step (I) provides the strengthened glass sheet with a depth of layer within a range of from about 35 μm to about 45 μm. In accordance with still another example of the first aspect, step (I) provides the first major surface of the glass sheet as an acid-etched surface.

In accordance with another example of the first aspect, after step (II), the method further comprises the step (III) of laminating the glass mirror to a support layer. For example, step (III) can include laminating the glass mirror to the support layer with a bonding layer. In one example the bonding layer has a thickness of from about 0.05 mm to about 4 mm. In another example, the bonding layer comprises a compound layer, for example, a structural layer sandwiched between two adhesive layers. In a further example, the support layer comprises a chemically strengthened glass support sheet that may have a thickness, for example, of from about 0.5 mm to about 2 mm.

In accordance with still another example of the first aspect, the method further includes the step (III) of providing a second chemically strengthened glass sheet with a thickness defined between a first major surface and a second major surface of the second glass sheet, wherein the thickness is less than or equal to about 2 mm. The method further includes the step (IV) of applying a reflective layer to the second major surface of the second glass sheet to provide a second glass mirror; and the step (V) of bonding the first glass mirror to the second glass mirror to provide a double-sided mirror.

The first aspect of the disclosure may be carried out alone or in combination with one or any combination of examples of the first aspect discussed above.

In accordance with a second aspect of the disclosure, a glass mirror apparatus comprises a chemically strengthened glass sheet with a thickness defined between a first major surface and a second major surface of the glass sheet. The thickness is less than or equal to about 2 mm. The glass mirror apparatus further includes a reflective layer applied to the second major surface of the glass sheet to provide a first glass mirror. In accordance with an example of the second aspect, the thickness of the glass sheet is within a range of from about 0.5 mm to about 1.2 mm.

In accordance with another example of the second aspect, the glass sheet comprises an ion exchange chemically strengthened glass sheet. For example, the strengthened glass sheet can include a compressive stress within a range of from about 500 MPa to about 800 MPa. In another example, the strengthened glass sheet includes a depth of layer within a range of from about 35 μm to about 45 μm. In accordance with still another example of the second aspect, the first major surface of the glass sheet comprises an acid-etched surface.

In yet another example of the second aspect, the glass mirror is laminated to a support layer. In one example, a bonding layer laminates the glass mirror to the support layer. In a further example, the bonding layer has a thickness of from about 0.05 mm to about 4 mm. In still further examples, the bonding layer can comprise a compound layer, such as a structural layer sandwiched between two adhesive layers. In another example, the support layer comprises a chemically strengthened glass support sheet, for example, with a thickness from about 0.5 mm to about 2 mm.

In still another example of the second aspect, the apparatus further comprises a second chemically strengthened glass sheet with a thickness defined between a first major surface and a second major surface of the second glass sheet. The thickness of the second chemically strengthened glass sheet is less than or equal to about 2 mm. The apparatus further includes a reflective layer applied to the second major surface of the second glass sheet to provide a second glass mirror. The first glass mirror is bonded to the second glass mirror to provide a double-sided mirror.

The second aspect of the disclosure may be provided alone or in combination with one or any combination of examples of the second aspect discussed above.

BRIEF DESCRIPTION OF THE DRAWINGS

These and other features, aspects and advantages of the present disclosure are better understood when the following detailed description is read with reference to the accompanying drawings, in which.

DETAILED DESCRIPTION

Figure 1:
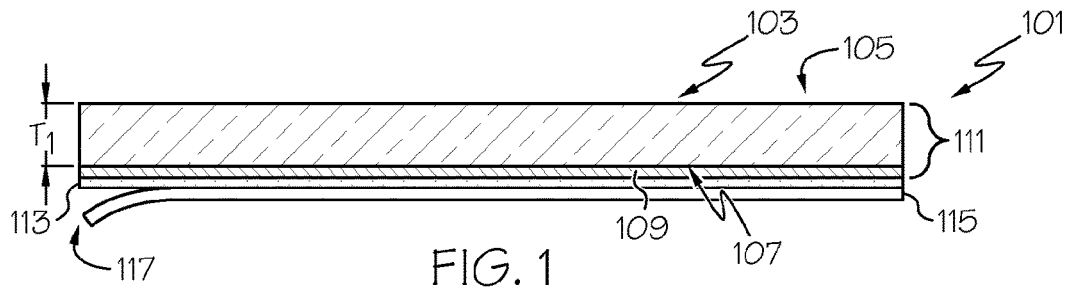
FIG. 1 illustrates a cross sectional view of a glass mirror apparatus in accordance with examples of the disclosure.

Apparatus and methods will now be described more fully hereinafter with reference to the accompanying drawings in which example embodiments of the disclosure are shown. Whenever possible, the same reference numerals are used throughout the drawings to refer to the same or like parts. However, this disclosure may be embodied in many different forms and should not be construed as limited to the embodiments set forth herein.

There is a desire to provide glass mirror apparatus with reduced weight and/or providing resistance to damage from various environmental conditions. Aspects of the disclosure incorporate relatively thin chemically strengthened glass sheets that can significantly reduce the overall weight of the glass mirror apparatus. Light-weight mirrors may be used, for example, in various furniture applications, household appliances, cosmetic uses, and/or various architectural applications (e.g., siding, decorative panels, cabinet installations, wall coverings or other architectural applications, such as indoor, outdoor or other architectural applications). The reduced weight of the glass mirror apparatus of the disclosure can provide advantages, for example, in furniture applications where weight may be considered an important customer attribute for glass mirrors. Indeed, the lower weight would allow easier assembly processes and do-it-yourself handling and home improvement projects. Moreover, use of low weight mirrors may also be featured in vehicle applications (e.g., automobiles, trains, aircraft, etc.) to increase fuel efficiency and reduce hazardous fuel emissions. Still further, providing damage-resistant glass mirrors (e.g., shatter-resistant, scratch resistant, etc) may prove particularly beneficial for vandal prone locations such as mirrors in public restrooms, public transportation vehicles and other decorative architectural uses. Furthermore, aspects of the disclosure can be designed to help retain glass shards in place in the event that the chemically strengthened glass sheet of the glass mirror apparatus breaks. As such, the combination of damage-resistance and capability of retaining glass shards in the event that the glass mirror breaks can enable a number of damage prone applications. Aspects of the disclosure can provide glass mirrors that are both light-weight and damage-resistant, thereby providing particular benefits in locations where lower weight and damage resistance are desired in the same glass mirror construction. Still further, aspects of the disclosure can provide high quality chemically strengthened and relatively thin display glass for the glass mirror that can improve optical performance of the mirror including a higher reflectance and lower parallax because of the use of a thin glass mirror sheet.

With reference to FIG. 1, a glass mirror apparatus 101 is provided with a chemically strengthened glass sheet 103. The chemically strengthened glass sheet 103 includes a thickness "T1" between a first major surface 105 and a second major surface 107 of the glass sheet 103. The thickness "T1" of the chemically strengthened glass sheet can be less than or equal to about 2 mm, such as within a range of from about 0.5 mm to about 1.6 mm, such as from about 0.5 mm to about 1.2 mm. Providing a thickness that is less than or equal to about 2 mm, such as within a range of from about 0.5 mm to about 1.6 mm, such as from about 0.5 mm to about 1.2 mm can provide a glass mirror with a reduced weight when compared to conventional mirror designs having relatively greater thicknesses. Moreover, providing a glass sheet that is chemically strengthened can provide a damage-resistant glass mirror that, due to the reduced thickness, also features a reduced weight when compared to conventional glass mirror constructions. In one example, the glass sheet comprises an ion exchange chemically strengthened glass sheet although chemical strengthening with other techniques may be carried out in further examples. Ion exchange chemical strengthening can provide beneficial attributes to the glass sheet. For example, the glass sheet strengthened by ion exchange chemical strengthening. In some examples, the strengthened glass includes a compressive stress within a range of from about 500 MPa to about 800 MPa. Such compressive stress may be provided to a depth (i.e., depth of layer) within a range of from about 35 µm to about 45 µm from the surface of the glass sheet.

The chemically strengthened glass sheet can also be provided with a first major surface having an acid-etched surface that can significantly further increase the strength of the glass sheet under certain applications.

As further illustrated in FIG. 1, the glass mirror apparatus 101 can further be provided with a reflective layer 109 applied to the second major surface 107 of the glass sheet 103 to provide a first glass mirror 111. Example reflective layers can include one or more layers of tin, silver and copper for enhanced reflection. Although not shown, the reflective layer 109 can further be backed by one or more layers of paint or other protective coatings to protect the reflective layer from chemical and mechanical damage such as oxidation and scratches. Still further, although not shown, the glass mirror 111 can be provided with an anti-splinter film to help retain glass shards, particles or other debris in the event the glass sheet is somehow shattered.

The glass mirror 111 can be provided alone, for example, with the chemically strengthened glass sheet 103 together with the reflective layer 109. Such glass mirrors can be subsequently mounted, for example, with mounting brackets to an appropriate support structure and/or can even be used alone as a light-weight, strong glass mirror.

FIG. 1 illustrates another example, where an optional adhesive layer 113 may be provided to facilitate mounting at a particular location. The optional adhesive layer 113 can comprise a pressure sensitive adhesive ("PSA"), an optical clear adhesive, thermal bonding film such as Polyvinyl Butyral ("PVB"), thermoplastic polyurethane ("TPU"), Ethylene-vinyl acetate ("EVA"), SentryGlas® ionomer interlayer, SentryGlas® Plus ionomer interlayer, Polyester ("PET"), acrylic (e.g., acrylic pressure sensitive adhesive tape), resin material, heat activated material or other type of adhesive or fastening mechanism depending on the application. For instance, a fastening mechanism, such as a hook and loop type fastener may be used or the like.

Figure 2:
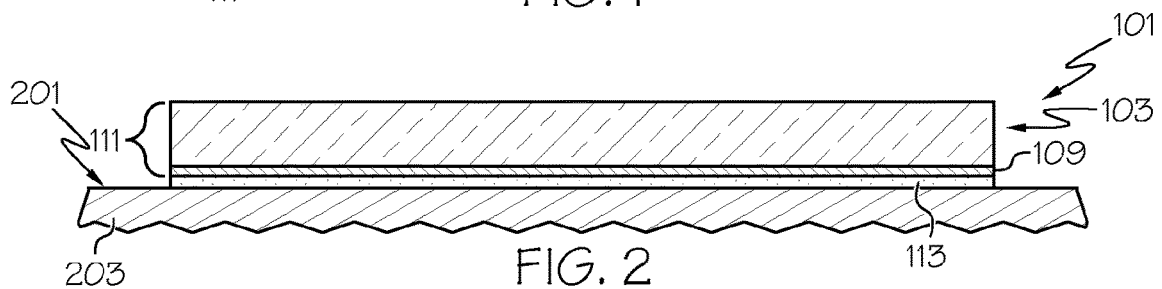
FIG. 2 illustrates the glass mirror apparatus of FIG. 1 being laminated to a support layer.

In further examples, an optional release liner 115 may be provided, such as a siliconized release liner, to protect the adhesive layer 113, such as a PSA layer, from contamination prior to being applied. As such, the glass mirror 111 may be provided with a fastening mechanism, such as the adhesive layer 113 and associated release liner 115. When ready to mount the mirror, an individual may remove the release liner 115 by peeling away an edge of the release liner as indicated at 117 to expose the underlying adhesive layer 113. Next, as shown in FIG. 2, the adhesive layer 113 can be used to laminate the glass mirror 111 to a preselected desired location of a mounting surface 201 of a support layer 203. The support layer 203, can comprise a panel of a furniture item, an outer housing of an appliance, an architectural application such as a wall surface (e.g., ceiling, vertical wall), a support frame, or other layer having a mounting surface. The mounting surface 201 of the support layer 203 may help resist bending of the glass sheet 103 and may therefore help increase the structural integrity of the glass mirror.

Figure 3:
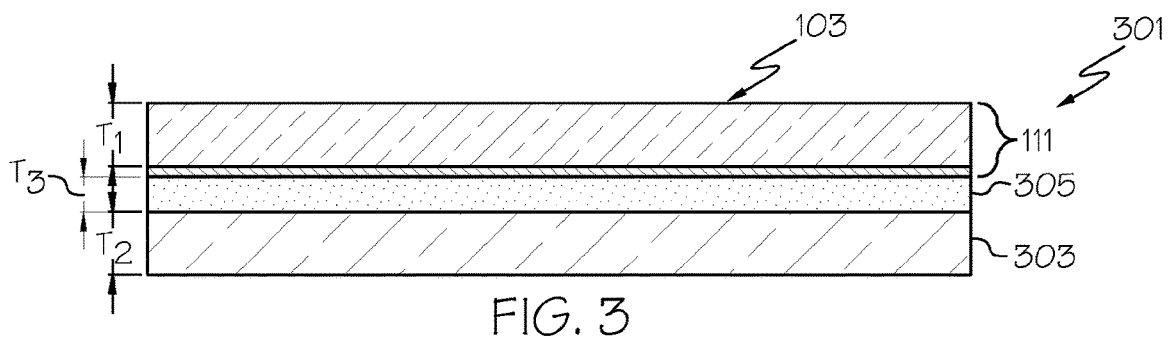
FIG. 3 illustrates a cross sectional view of a glass mirror apparatus in accordance with further examples of the disclosure.

FIG. 3 illustrates another example of a glass mirror apparatus 301 that can include the glass mirror 111 discussed above. As shown, the glass mirror 111 is laminated to a support layer 303 that may comprise a glass support sheet, such as a chemically strengthened glass support sheet. The support layer 303 can include a thickness "T2" that may be substantially the same as the thickness "T1" of the glass sheet 103 although that thickness "T2" may be greater than or less than the thickness "T1" in further examples. For instance, in some examples, the support layer 303 may comprise a chemically strengthened glass support sheet with a thickness "T2" of from about 0.5 mm to about 2 mm. Providing the support layer 303 as a chemically strengthened glass support sheet can help further strengthen the glass mirror apparatus while reducing the overall thickness of the glass mirror apparatus when compared to other designs.

Although not shown in FIG. 3, the support layer can comprise materials other than chemically strengthened glass, such as plastic, other types of glass (e.g., soda lime glass), metal, wood, lightweight honeycomb structures or other material types and/or composites.

As further illustrated in FIG. 3, the glass mirror apparatus 301 can also include a bonding layer 305 configured to laminate the glass mirror 111 to the support layer 303. The bonding layer can comprise a wide range of materials including a wide range of thicknesses. In one example, the bonding layer 305 includes a thickness "T3" from about 0.05 mm to about 4 mm although other thicknesses may be provided in further examples. The bonding layer can comprise a pressure sensitive adhesive ("PSA"), an optical clear adhesive, thermal bonding film such as Polyvinyl Butyral ("PVB"), thermoplastic polyurethane ("TPU"), Ethylene-vinyl acetate ("EVA"), SentryGlas® ionomer interlayer, SentryGlas® Plus ionomer interlayer, Polyester ("PET"), acrylic (e.g., acrylic pressure sensitive adhesive tape), resin material, heat activated material or other type of adhesive or fastening mechanism depending on the application. The bonding layer 305 facilitates lamination between the glass mirror 111 and the support layer 303. In some examples, the bonding layer 305 can provide a primary function of laminating the glass mirror 111 to the support layer 303. In further examples, the bonding layer 305 may also act to help retain glass shards, particles or other debris in the event that the glass sheet 103 shatters or otherwise fails under certain events. Still further, the bonding layer 305 can comprise an additional function of providing a significant level of structural integrity to the overall glass mirror apparatus construction. Indeed, the bonding layer 305 may comprise a sheet of material configured adhere the glass mirror 111 to the support layer 303 while also comprising a substantially rigid sheet of material configured to increase the rigidity of the overall glass mirror apparatus. In some examples, such bonding layers 305 may comprise a heat activated layer, such as a thermoplastic layer, that may be heated up and then cooled to provide a structural sheet of material that also functions to mount the glass mirror 111 to the support layer 303.

Figure 4:
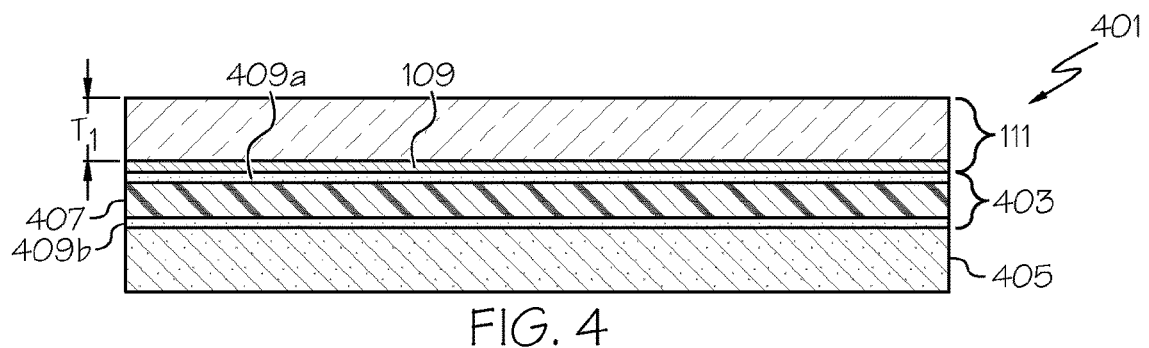
FIG. 4 illustrates a cross sectional view of a glass mirror apparatus in accordance with still further examples of the disclosure.

As shown in FIG. 3, the bonding layer 305 can comprise a single layer of material although a plurality of layers of material may be provided in further examples. FIG. 4 illustrates yet another example of a glass mirror apparatus 401 that includes a bonding layer comprising a compound layer 403 configured to laminate the glass mirror 111 to a support layer 405. The compound layer can comprise several layers of similar, such as identical, materials that may be stacked to provide the overall desired bonding layer thickness. Alternatively, as shown, one or more of the layers may provide a support functionality designed to increase the structural rigidity of the glass mirror apparatus 401 while also including further layers configured to facilitate adhering the glass mirror 111 to the support layer 405. In the illustrated example, the compound layer 403 includes a structural layer 407 sandwiched between two adhesive layers 409a, 409b that may be substantially identical to one another or may be different types of adhesive layers. For example, the adhesive layer 409a can be chosen to provide beneficial lamination between the glass mirror 111 and the structural layer 407 while the adhesive layer 409b can be chosen to provide beneficial lamination between the support layer 405 and the structural layer 407.

Example structural layers 407 of FIG. 4, can comprise a polycarbonate sheet having a thickness of from about 3 mm to about 4 mm although other thicknesses may be used in further examples. Moreover, the structural layer 407 can comprise other alternative materials, for example, similar or identical to the materials used for the support layers discussed throughout the application although other materials may be used in further examples.

Example adhesive layers 409a, 409b of FIG. 4, the adhesive layer 113 of FIGS. 1 and 2, and/or the bonding layer 305 of FIG. 3 can comprise a pressure sensitive adhesive ("PSA") (e.g., 0.05 mm thick), an optical clear adhesive, thermal bonding film such as Polyvinyl Butyral ("PVB") (e.g., 0.76 mm thick), thermoplastic polyurethane ("TPU"), Ethylene-vinyl acetate ("EVA"), SentryGlas® ionomer interlayer (e.g., 1.89 mm thick), SentryGlas® Plus ionomer interlayer (e.g., 1.89 mm thick), Polyester ("PET"), acrylic (e.g., acrylic pressure sensitive adhesive tape), resin material, heat activated material or other type of adhesive or fastening mechanism depending on the application. The structural support layer 407 can comprise a polycarbonate layer, for example, with a thickness of from about 1.5 mm to about 4 mm thick, such as about 3 mm thick.

In the example of FIG. 4, the structural integrity provided by the structural layer 407 of the compound layer 403 may reduce the rigidity requirements of the support layer 405 to provide the overall glass mirror apparatus 401 with the desired strength characteristics. For example, as shown in FIG. 4, the support layer 405 may comprise particle board although wood, glass (strengthened or not strengthened), metal, plastic or other materials may be used as the support layer 405.

Figure 5:
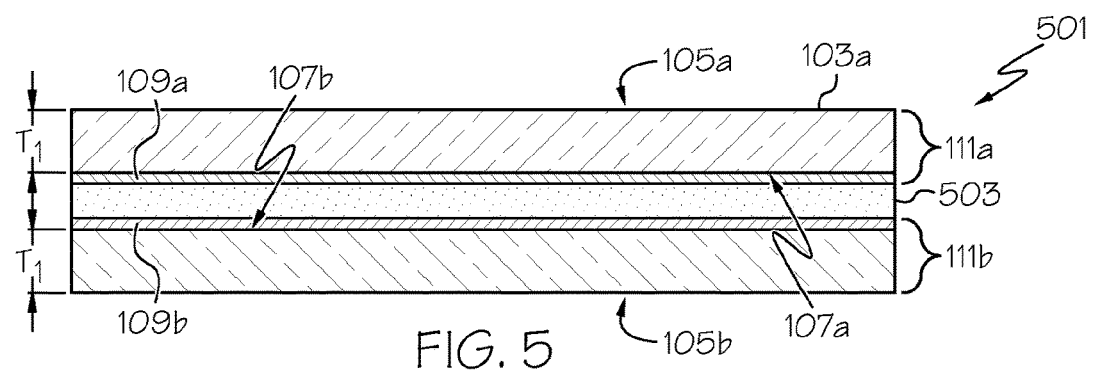
FIG. 5 illustrates a cross sectional view of a glass mirror apparatus in accordance with yet further examples of the disclosure.

FIG. 5 illustrates still another example of a glass mirror apparatus 501 including a first glass mirror lila and a second glass mirror 111b that may be similar or identical to the glass mirror 111 discussed above. Indeed, the first glass mirror 111a may include a first chemically strengthened glass sheet 103a similar to or identical to the chemically strengthened glass sheet 103 discussed above. The first chemically strengthened glass sheet 103a includes a thickness "T1" defined between a first major surface 105a and a second major surface 107a of the first glass sheet 103a, wherein the thickness is less than or equal to about 2 mm. A first reflective layer 109a can also be provided that is similar or identical to the reflective layer 109 discussed above. Likewise, the second glass mirror 111b may include a first chemically strengthened glass sheet 103b similar to or identical to the chemically strengthened glass sheet 103 discussed above. The second chemically strengthened glass sheet 103b includes a thickness "T1" defined between a first major surface 105b and a second major surface 107b of the second glass sheet 103b, wherein the thickness is less than or equal to about 2 mm. A second reflective layer 109b can also be provided that is similar or identical to the reflective layer 109 discussed above.

As shown in FIG. 5, the first glass mirror 111a is bonded to the second glass mirror 111b to provide a double-sided mirror. Any of the bonding techniques used to bond the glass mirror 111 to the support layer discussed with respect to FIGS. 1-4 above may be used to bond the first glass mirror 111a to the second glass mirror 111b. For example, a bonding layer 503 may be provided with a thickness of from about 0.05 mm to about 4 mm. For instance, the bonding layer 503 can comprise a pressure sensitive adhesive ("PSA") (e.g., 0.05 mm thick), an optical clear adhesive, thermal bonding film such as Polyvinyl Butyral ("PVB") (e.g., 0.76 mm thick), thermoplastic polyurethane ("TPU"), Ethylene-vinyl acetate ("EVA"), SentryGlas® ionomer interlayer (e.g., 1.89 mm thick), SentryGlas® Plus ionomer interlayer (e.g., 1.89 mm thick), Polyester ("PET"), acrylic (e.g., acrylic pressure sensitive adhesive tape), resin material, heat activated material or other type of adhesive or fastening mechanism depending on the application. As shown in FIG. 5, a single bonding layer is provided although a compound bonding layer may be provided in further examples. For instance, the bonding layer 503 may comprise compound layer similar or identical to the compound layer discussed with respect to FIG. 4 above.

Figure 6:
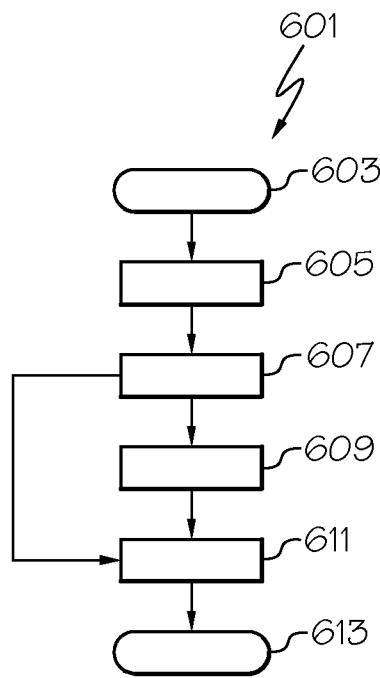
FIG. 6 is a flow chart illustrating example methods of manufacturing a glass mirror for a glass mirror apparatus.

Example methods of manufacturing a glass mirror apparatus will now be described with reference to FIGS. 6 and 7. Referring to FIG. 6, the method can include the step 601 of providing the chemically strengthened glass sheet 103 with the thickness "T1" defined between the first major surface 105 and the second major surface 107 of the glass sheet 103. The method can provide the thickness "T1" of the chemically strengthened glass sheet 103 of less than or equal to about 2 mm, such as from about 0.5 mm to about 1.6 mm, such as from about 0.5 mm to about 1.2 mm.

The step 601 of providing the chemically strengthened glass sheet 103 may, for example, include the step of obtaining the glass sheet after it has been fabricated. Alternatively, as shown in FIG. 6, the step 601 of providing the chemically strengthened glass sheet 103 can begin at 603 with the step 605 of providing a glass sheet. Glass sheets can be provided in a wide range of ways, for example, the glass sheets may be obtained from a glass ribbon produced by way of a down-draw, up-draw, float, fusion, press rolling, slot draw or other glass forming process techniques. In just one example, a glass ribbon may be fusion down-drawn from a forming wedge to produce glass having pristine surfaces. Moreover, the glass ribbon can be drawn with a thickness of less than about 2 mm thick, such as from about 0.5 mm to about 1.6 mm, such as from about 0.5 mm to about 1.2 mm thick. As such, glass sheets may be provided from the glass ribbon with an appropriate size by various separation techniques (e.g., mechanical and/or laser scoring or breaking techniques). The glass sheet can be substantially flat although the glass sheet 103 can include a curved shape depending on the application.

The glass sheet can be formed from a wide range of glass materials depending on the particular application. In one example, the glass sheet may be formed from a glass material that, after processing to form the final glass sheet configuration, may be chemically strengthened (e.g., by ion exchange strengthening) to provide a durable and light weight glass sheet for subsequent processing into the glass mirror 111. For example, the glass sheet may comprise aluminosilicate glass, alkali-aluminoborosilicate glass or other glass formulations.

Once processed into the final shape, as shown in FIG. 6, the glass sheet can be subsequently chemically strengthened during step 607. In one example, step 607 chemically strengthens the glass sheet by ion exchange. In one example, the step 607 chemically strengthens the glass sheet to provide the chemically strengthened glass sheet 103 with a compressive stress within a range of from about 500 MPa to about 800 MPa. In another example, the step 607 chemically strengthens the glass sheet to a depth of layer within a range of from about 35 µm to about 45 µm.

In one example, step 607 chemically strengthens the glass sheets into chemically strengthened glass sheets 103 comprising Corning® Gorilla® glass from Corning Incorporated. Such chemically strengthened glass, for example, may be carried out in accordance with U.S. Pat. Nos. 7,666,511; 4,483,700 and 5,674,790. Chemical strengthening may be carried out by an ion exchange process. For instance, after producing the glass sheet (e.g., aluminosilicate glass, alkali-aluminoborosilicate glass) made by fusion drawing and breaking away the glass sheet from the glass ribbon, the glass sheet may then be chemically strengthened by immersing the glass sheet in a molten salt bath for a predetermined period of time. Ions within the glass sheet at or near the surface of the glass sheet are exchanged for larger metal ions, for example, from the salt bath. In one embodiment, the temperature of the molten salt bath is about 430° C. and the predetermined time period is about 8 hours. In another embodiment, the temperature of the molten salt bath is nearly 450° C. and the predetermined time period is about 4.5 hours.

The incorporation of the larger ions into the glass strengthens the glass sheet by creating a compressive stress in a near surface region. A corresponding tensile stress is induced within a central region of the glass sheet to balance the compressive stress.

The chemical strengthening process of Corning® Gorilla® glass can be used to strengthen the glass sheet 103. Once strengthened, the glass sheet 103 can have a relatively high compressive stress (e.g., from about 700 MPa to about 730 MPa; and even capable of greater than 800 MPa) at a relatively deep depth from the surface (e.g., about 40 microns; and even capable of greater than 100 microns). Such glass can have a high retained strength and high resistance to scratch damage, high impact resistance, high flexural strength as well as a pristine surface. One example glass composition can comprise $SiO_2$, $B_2O_3$ and $Na_2O$, where $(SiO_2+B_2O_3)\geq 66$ mol. %, and $Na_2O \geq 9$ mol. %.

As shown by optional step 609 in FIG. 6, the chemically strengthened glass sheet 103 can optionally undergo a further acid etching step to further strengthen the glass sheet 103. The acid etching step 609, in some examples, can remove from about 1.5 to about 1.7 microns from the surfaces of the chemically strengthened glass sheet 103. Acid etching addresses the fact that glass strength is extremely sensitive to the size and the tip shape of surface flaws. By removing the above-mentioned surface layer, the acid etching can clear away a majority of surface flaws smaller than 1 micron. While acid etching may not remove larger flaws, the acid etching procedure will tend to round the flaw tip which would otherwise dramatically decrease the stress concentration factor. The improvement in glass surface (e.g., removal of small surface flaws and rounding the tips of larger flaws) can dramatically increase glass strength, such as impact resistance. Moreover, only a relatively small depth of glass is removed, that will not result in significant compressive stress drop in the chemically strengthened glass sheet which has relatively high compressive stress at a much larger depth into the glass sheet such as 40 microns from the surface, or even greater than 100 microns in some examples.

In one example, the acid etching step can be conducted on a horizontal spray etching system, with a chemical solution of 1.5M HF/0.9M $H_2SO_4$. The other process parameters can include process temperature of 90° F. (32.2° C.), process time of 40 seconds, spray pressure of 20 psi, spray oscillation of 15 cycles per minute, and using 0.48 gallon-per-minute conical spray nozzles. After acid etching, the processed glass sheet may be cleaned with a rinse step using water, with the spray pressure of 20 psi and through 0.3 gallon-per-minute fanjet pattern nozzles. Then, the acid-etched chemically strengthened glass sheet may be dried under 5 hp air turbine supplying air with an air flow dryer system As shown in FIG. 6, the method can further include the step 611 of applying the reflective layer 109 to the second major surface 107 of the glass sheet 103 to provide the glass mirror 111. Example reflective layers can include one or more layers of tin, silver and copper for enhanced reflection. Although not shown, method can further include the step of applying a backing to the reflective layer 109, such as one or more layers of paint or other protective coatings to protect the reflective layer from chemical and mechanical damage such as oxidation and scratches. Still further, the method can also include the step of providing the mirror with an antisplinter film to help retain glass shards, particles or other debris in the event the glass sheet is somehow shattered. The method can end at step 613 wherein the glass mirror is produced that may be used alone or in combination with a support layer or other applications.

Figure 7:
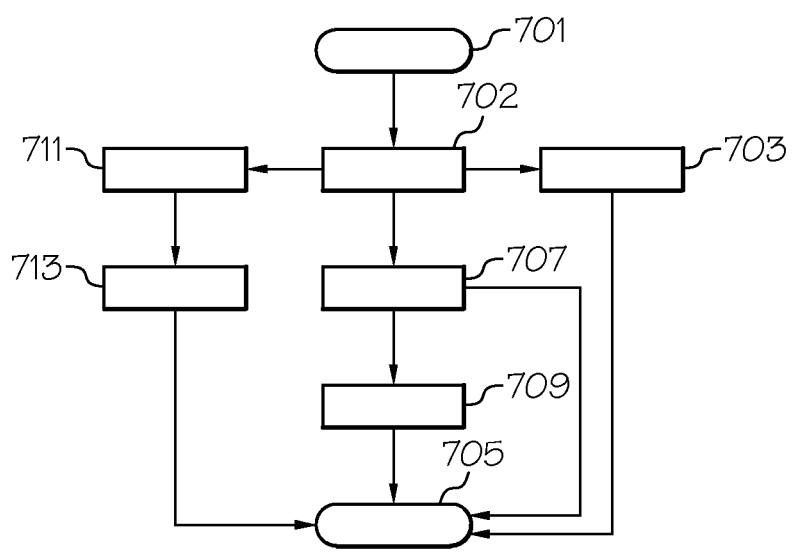
FIG. 7 is a flow chart illustrating examples methods of manufacturing a glass mirror apparatus with the glass mirror manufactured by the methods illustrated in FIG. 6.

As shown in FIG. 7, the glass mirror apparatus can further include method beginning at 701 with the step 702 of providing a glass mirror as discussed with respect to step 601 of FIG. 6 above. The method can then optionally proceed to step 703 of laminating the glass mirror to a support layer. For example, as shown in FIG. 2, step 703 can include laminating the glass mirror 111 to the mounting surface 201 of the support layer 203. As shown in FIG. 3, the step 703 can include laminating the glass mirror 111 to a support layer comprising a glass sheet 303 (e.g., a chemically strengthened glass sheet). As shown in FIG. 3, in one example, the glass sheet comprises a chemically strengthened glass support sheet with a thickness of from about 0.5 mm to about 2 mm.

As shown in FIG. 4, the step 703 can include laminating the glass mirror 111 to the support layer 405 comprising particle board although wood, glass (strengthened or not strengthened), metal plastic or other materials may be used as the support layer 405. Still further, as shown in FIG. 5, the step 703 can include laminating the glass mirror 111a to a support layer comprising another glass mirror 111b to provide a double sided mirror apparatus.

The step 703 of laminating the glass mirror to the support layer may be carried out in some examples with a bonding layer. In some examples, the bonding layer may have a thickness of a thickness of from about 0.05 mm to about 4 mm although other thicknesses may be used in further examples. Moreover, as shown in FIGS. 1-3 and 5, the bonding layer 113, 305, 503 may comprise a single layer although multiple layers may be provided in further examples. For instance, as shown in FIG. 4, the bonding layer 403 can comprise a compound layer in some examples. In one particular example, the compound layer may optionally include a structural layer 407 sandwiched between two adhesive layers 409a, 409b. Once the step 703 is completed, the method of forming the glass mirror apparatus can be considered completed as indicated by reference number 705.

In another optional example, after the step 702 of providing the glass mirror 111, the method can proceed to step 707 of providing a bonding layer. For example, as shown in FIG. 1, the glass mirror 111 can be provided with the adhesive layer 113. The method can then proceed to step 709 of laminating the glass mirror 111 to the support layer with the adhesive layer 113. For example, as shown in FIG. 2, the method step 709 can include pressing the glass mirror against the mounting surface 201 of the support layer 203 such that the adhesive layer 113 laminates the glass mirror 111 to the support layer 203. In another example, step 707 allows lamination of the glass mirror 111 to a support layer 303 with a bonding layer 305 as shown in FIG. 3. Alternatively, step 707 can provide lamination of the glass mirror 111 to a support layer 405 by a compound bonding layer 403. The bonding layer or portions of the bonding layer can comprise a pressure sensitive adhesive ("PSA"), an optical clear adhesive, thermal bonding film such as Polyvinyl Butyral ("PVB"), thermoplastic polyurethane ("TPU"), Ethylene-vinyl acetate ("EVA"), SentryGlas® ionomer interlayer, SentryGlas® Plus ionomer interlayer, Polyester ("PET"), acrylic (e.g., acrylic pressure sensitive adhesive tape), resin material, heat activated material or other type of adhesive or fastening mechanism depending on the application. In some examples, some bonding layers may be first conditioned in a controlled chamber at a temperature in a range of from about 20° C. to about 25° C. and a relative humidity of from about 24% to about 28% R.H. (Relative Humidity), then laminated with the glass mirror 111 and the bonding layer 305, 403 within a clean environment (e.g., within a clean room having dust control configurations), and finally bonded thermally at a specific temperature (e.g., ranging from about 95° C. to about 150° C.) and a pressure from about 70 psi to about 90 psi so as to achieve a desired lamination between the glass mirror and the support layer. Other bonding layers need not require thermal bonding in the manufacturing process such as pressure sensitive adhesives ("PSA"), optical clear adhesive films ("OCA"), and UV curable adhesive layers. Such layers can be relatively thin (e.g., from about 0.05 mm to about 0.3 mm) when compared to other types of bonding layers.

As mentioned previously, the bonding layer may comprise a compound bonding layer 403. Such compound layers may be desired in applications that benefit from increased thickness and/or rigidity. In such examples, the compound bonding layer 403 can comprise a structural layer 407 sandwiched between two adhesive layers 409*a*, 409*b* that may be substantially identical to one another or may be different types of adhesive layers. In one example, the structural layer 407 can comprise a polycarbonate sheet having a thickness of from about 3 mm to about 4 mm although other thicknesses may be used in further examples depending on the particular desired attributes (e.g., weight, rigidity, etc.). The adhesive layers 409*a*, 409*b*, for example, may comprise PSA film with a thickness, for example of about 50 µm. In another example, the adhesive layers 409*a*, 409*b* may comprise PVB film, for example, having a thickness of about 0.38 mm or about 0.76 mm.

In still another example, after the step 702 of providing the first glass mirror 111*a*, the method can then proceed to step 711 of providing a second glass mirror as discussed with respect to step 601 to FIG. 6 above. For example, step 711 can include the step of providing a second chemically strengthened glass sheet with a thickness defined between a first major surface and a second major surface of the second glass sheet, wherein the thickness is less than or equal to about 2 mm. Step 711 can further include the step of applying a reflective layer to the second major surface of the second glass sheet to provide the second glass mirror 111*b*. Once the first and second glass mirrors 111*a*, 111*b* are provided, the method can then proceed to step 713 of bonding the first glass mirror 111*a* to the second glass mirror 111*b* to provide a double-sided mirror (e.g., as shown in FIG. 5). Examples of bonding can be carried out with any of the bonding layers mentioned with respect to FIGS. 1-4 above.

It will be apparent to those skilled in the art that various modifications and variations can be made to the present disclosure without departing from the spirit and scope of the invention. Thus, it is intended that the present invention cover the modifications and variations of this disclosure provided they come within the scope of the appended claims and their equivalents.

What is claimed is:

1. A method of manufacturing a glass mirror apparatus, there method comprising:
    applying a reflective layer to a second major surface of a chemically strengthened glass sheet to provide a first glass mirror, the glass sheet comprising a thickness defined between a first major surface and the second major surface of the glass sheet, wherein the thickness is less than or equal to about 2 mm;
    laminating the first glass mirror to a support layer with a bonding layer, providing a second chemically strengthened glass sheet with a thickness defined between a first major surface and a second major surface of the second glass sheet, wherein the thickness is less than or equal to about 2 mm;
    applying a reflective layer to the second major surface of the second glass sheet to provide a second glass mirror, the second glass sheet comprising a thickness defined between the first major surface and the second major surface of the second glass sheet, wherein the thickness is less than or equal to about 2 mm; and
    bonding the first glass mirror to the second glass mirror to provide a double-sided mirror;
    wherein the bonding layer comprises a compound layer having a structural layer sandwiched between two adhesive layers, and
    wherein the glass sheets comprises aluminosilicate glass, or alkali-aluminoborosilicate glass.

2. The method of claim 1, wherein the thickness of the glass sheets is within a range of from about 0.5 mm to about 1.2 mm.

3. The method of claim 1, wherein the glass sheets comprises an ion exchanged chemically strengthened glass sheet.

4. The method of claim 3, wherein the strengthened glass sheets comprises a compressive stress within a range of from about 500 MPa to about 800 MPa.

5. The method of claim 3, wherein the strengthened glass sheets comprises a depth of layer within a range of from about 35 µm to about 45 µm.

6. The method of claim 1, wherein the first major surface of the glass sheets comprises an acid-etched surface.

7. The method of claim 1, wherein the bonding layer has a thickness of from about 0.05 mm to about 4 mm.

8. The method of claim 1, wherein the support layer comprises a chemically strengthened glass support sheet having a thickness of from about 0.5 mm to about 2 mm.

9. A glass mirror apparatus comprising:
    a support layer;
    a first chemically strengthened glass sheet with a thickness defined between a first major surface and a second major surface of the glass sheet, wherein the thickness is less than or equal to about 2 mm;
    a reflective layer applied to the second major surface of the first glass sheets to provide a first glass mirror;
    a bonding layer laminating the first glass mirror to the support layer,
    a second chemically strengthened glass sheet with a thickness defined between a first major surface and a second major surface of the second glass sheet, wherein the thickness is less than or equal to about 2 mm; and
    a reflective layer applied to the second major surface of the second glass sheet to provide a second glass mirror,
    wherein the bonding layer comprises a compound layer having a structural layer sandwiched between two adhesive layers,
    wherein the glass sheet comprises aluminosilicate glass, or alkali-aluminoborosilicate glass, and
    wherein the first glass mirror is bonded to the second glass mirror to provide a double-sided mirror.

10. The apparatus of claim 9, wherein the thickness of the glass sheets is within a range of from about 0.5 mm to about 1.2 mm.

11. The apparatus of claim 9, wherein the glass sheets comprises an ion exchanged chemically strengthened glass sheet.

12. The apparatus of claim 11, wherein the strengthened glass sheets includes a compressive stress within a range of from about 500 MPa to about 800 MPa.

13. The apparatus of claim 11, wherein the strengthened glass sheets includes a depth of layer within a range of from about 35 µm to about 45 µm.

14. The apparatus of claim 9, wherein the first major surface of the glass sheets comprises an acid-etched surface.

15. The apparatus of claim 9, wherein the bonding layer has a thickness of from about 0.05 mm to about 4 mm.

16. The apparatus of claim 9, wherein the support layer comprises a chemically strengthened glass support sheet having a thickness of from about 0.5 mm to about 2 mm.

* * * * *